(12) United States Patent
Ngo (10) Patent No.: US 6,863,446 B2
(45) Date of Patent: Mar. 8, 2005

(54) OPTICAL CONNECTOR ADAPTER WITH LATCH INSERTS

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 130 days.

(21) Appl. No.: 10/091,906

(22) Filed: Mar. 5, 2002

(65) Prior Publication Data

US 2003/0169974 A1 Sep. 11, 2003

(51) Int. Cl.[7] .............................................. G02B 6/38
(52) U.S. Cl. ........................... 385/72; 385/56; 385/58; 385/60; 439/344; 439/357
(58) Field of Search .............................. 385/72, 56, 58, 385/60; 439/344, 357, 354

(56) References Cited

U.S. PATENT DOCUMENTS

| | | | | |
|---|---|---|---|---|
| 5,317,663 | A | | 5/1994 | Beard et al. .................. 385/70 |
| 5,333,221 | A | | 7/1994 | Briggs et al. ................. 385/55 |
| 5,563,971 | A | | 10/1996 | Abendschein ................ 385/55 |
| 5,692,080 | A | * | 11/1997 | Lu ............................... 385/60 |
| 5,774,611 | A | | 6/1998 | Nagase et al. ................ 385/58 |
| 5,774,612 | A | | 6/1998 | Belenkiy et al. ............. 385/72 |
| 5,781,680 | A | | 7/1998 | Womack et al. .............. 385/53 |
| 5,862,282 | A | | 1/1999 | Matsuura et al. ............. 385/86 |
| 5,887,095 | A | | 3/1999 | Nagase et al. ................ 385/58 |
| 5,909,526 | A | | 6/1999 | Roth et al. .................... 385/78 |
| 5,915,058 | A | | 6/1999 | Clairardin et al. ............ 385/77 |
| 6,027,252 | A | | 2/2000 | Erdman et al. ............... 385/76 |
| 6,102,581 | A | | 8/2000 | Deveau et al. ................ 385/56 |
| 6,123,463 | A | | 9/2000 | Kashihara et al. ............ 385/60 |
| 6,193,420 | B1 | | 2/2001 | Sikorski, Jr. ................. 385/55 |
| 6,412,986 | B1 | * | 7/2002 | Ngo et al. .................... 385/53 |
| 6,431,762 | B1 | * | 8/2002 | Taira et al. ................... 385/56 |
| 6,471,416 | B2 | * | 10/2002 | Lu ............................... 385/60 |
| 2002/0172469 | A1 | * | 11/2002 | Benner et al. ................ 385/55 |
| 2002/0181888 | A1 | * | 12/2002 | Zimmei ....................... 385/72 |
| 2003/0072536 | A1 | * | 4/2003 | Shibutani et al. ............. 385/70 |

* cited by examiner

Primary Examiner—Michael C. Zarroli
(74) Attorney, Agent, or Firm—Harrington & Smith, LLP (57) ABSTRACT

An optical connector adapter comprising a housing, and a pair of latch inserts. The housing has at least one passage formed therein for receiving a pair of connectors adapted to be mated to each other inside the housing. The pair of latch inserts are located in the passage of the housing. Each latch insert is adapted for locking a corresponding connector from the pair of connectors to the housing. At least one latch insert from the pair of latch inserts has a spring loaded projection. The housing has at least one detent formed therein. The spring loader projection on the at least one latch insert is bias into the at least one detent locking the at least one latch insert to the housing.

32 Claims, 7 Drawing Sheets

OPTICAL CONNECTOR ADAPTER WITH LATCH INSERTS

BACKGROUND OF THE INVENTION

1. Field of the Invention

The present invention relates to optical connector adapters and, more particularly, to optical connector adapters having latch inserts.

2. Brief Description of Earlier Developments

Optical connector adapters are used generally for end to end mating of optical connectors. Optical connectors intended to be mated to each other are inserted into the adapter. The adapter aligns and positions the connectors relative to each other to effect a connection. The adapters include receptacles into which the connectors are inserted, and it is the receptacles that accurately position the connectors relative to each other. Also, the receptacles may have locking features which lock the connectors to the adapter, and hence, to each other. Conventional adapters are made in pieces. For example, the conventional adapter may have an outer frame with features, such as flanges, for mounting the adapter to printed circuit boards (PCBs) or the chassis of electronic devices. The inner receptacles of the adapter may be molded separately from the outer frame. Having the receptacles made apart from the outer frame allows the receptacles to be shaped more accurately to better interface with the connector inserted therein, and also simplifies manufacture of both the outer frame and the inner receptacles. This in turn reduces manufacturing costs. However, the outer frame of the adapter is sectioned in order to facilitate installation of the inner receptacles into the outer frame. For example, the adapter frame may be sectioned into halves. The receptacle may be inserted into each half, such as by press fitting the receptacle into the appropriate half frame. Then, the half frames, with the receptacles therein may be bonded to each other by means such as ultrasonic bonding. This method is likely to result in misalignment between the receptacles in the adapter. This may be caused by small differences in the positioning of the receptacles in the frame halves, which are compounded when the position of one receptacle is related to the adjoining receptacles. Also, some misalignment between receptacles may be introduced when the adapter halves are mated and then bonded. The misalignment between receptacles in turn causes misalignment between mating connectors inside the adapter thereby degrading the connection between connectors. One example of an optical connector adapter is disclosed in U.S. Pat. No. 5,317,663, which provides an adapter for holding coaxially aligned connectors. The adapter here has a main body with a side opening for installing a inner housing into the main body. The opening in the main body is covered with a panel. The large opening reduces the rigidity of the main body in this adapter. U.S. Pat. No. 5,563,971 discloses another example of a conventional optical adapter comprising first and second receptacle members and separate alignment sleeves located in the receptacle members. U.S. Pat. No. 5,774,611 discloses still another example of a conventional adapter comprising an outer part and an inner part fixedly held in the outer part. The inner part is one molding which may be difficult and costly to produce especially in the case of larger multi-fiber optical connectors. The present invention overcomes the problems of conventional adapters for all connector types (i.e. SC, LP, MTP, or MPO connectors).

SUMMARY OF THE INVENTION

In accordance with the first embodiment of the present invention, an optical connector adapter is provided. The optical connector adapter comprises a housing, and a pair of latch inserts. The housing has at least one passage formed therein for receiving a pair of connectors adapted to be mated to each other. The pair of latch inserts is located in the at least one passage of the housing. Each latch insert is adapted for locking a corresponding connector of the pair of connectors to the housing. At least one latch insert has a spring loaded projection. The housing has at least one detent formed therein. The spring loaded projection on the at least one latch insert is biased into the at least one detent locking the at least one latch insert to the housing.

In accordance with the second embodiment of the present invention, an optical connector adapter is provided. The adapter comprises an outer housing, and a pair of inner housings. The outer housing has at least one passage extending through the outer housing for mating a pair of opposing connectors therein. The pair of inner housings is located in the at least one passage. Each inner housing has a receptacle for receiving a corresponding connector of the pair of connectors. Each housing has a latch for locking the corresponding connector to the inner housing. The outer housing is a one-piece member. The pair of inner housings is inserted into the at least one passage from opposite ends of the passage.

In accordance with another embodiment of the present invention, an optical connector adapter is provided. The adapter comprises an outer housing, and a pair of inner connector receptacles. The outer housing has at least one passage extending through the housing for mating a pair of opposing connectors therein. The pair of inner connector's receptacles is located in the passage. Each inner connector receptacle is adapted for receiving a corresponding connector. The connector receptacle is adapted for locking the corresponding connector to the outer housing. The outer housing has a pair of guide rails for guiding insertion of the pair of inner connector receptacles into the passage. A first one of the guide rails allows insertion of the first one of the inner connector receptacles through only one end of the passage. A second one of the guide rails allows insertion of a second one of the inner connector receptacles through only an opposite end of the passage.

In accordance with a method of the present invention, a method for fabricating a optical connector adapter is provided. The method comprises the steps of providing an outer housing, inserting a first inner housing into the outer housing, securing the first inner housing to the outer housing, inserting a second inner housing into the outer housing, and securing the second inner housing to the outer housing. The outer housing is provided as a one-piece member. The outer housing is adapted for mating a pair of optical connectors therein. The outer housing has at least one passage extending through the housing. The first inner housing is inserted into the passage. The first inner housing has a first receptacle adapted for receiving the first connector therein. The second inner housing is inserted into the at lease one passage. The second inner housing has a second receptacle adapted for receiving a second connector therein. The first and second inner housings are inserted into the passage through opposite ends of the passage.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
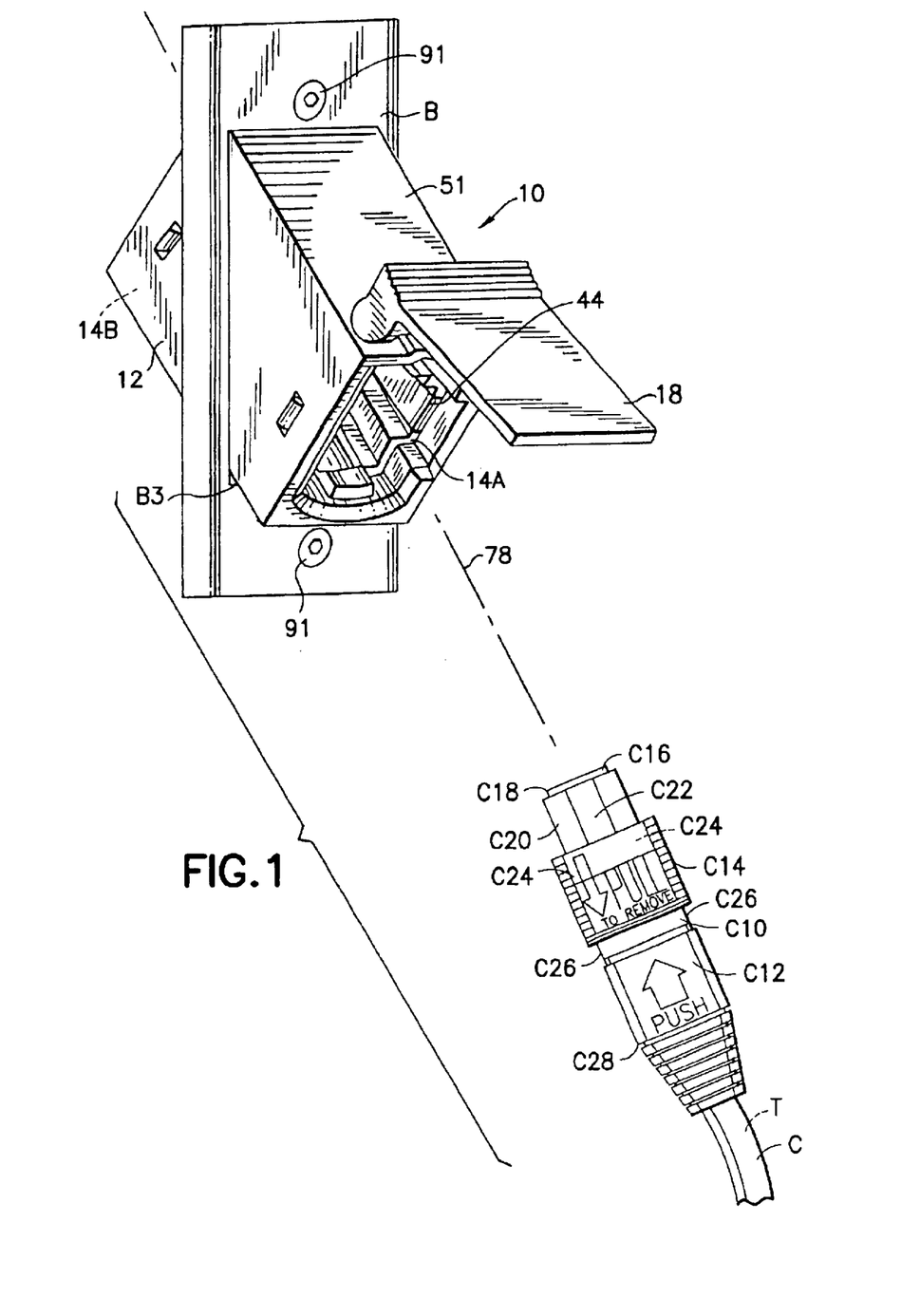
FIG. 1 is a perspective view of an optical connector adapter assembly incorporating features of the present invention, a back panel B, and a connectorized optical conductor C, the adapter assembly is shown mounted to the back panel B, and the conductor is shown removed from the adapter assembly.

Referring to FIG. 1, there is shown a perspective view of an optical connector adapter assembly 10 incorporating features of the present invention, a back panel B and a connectorized optical conductor C. Although the present invention will be described with reference to the drawings, it should be understood that the present invention can be embodied in many alternate forms of embodiments. In addition, any suitable size, shape or type of elements or materials could be used.

In FIG. 1, the optical connector adapter assembly 10 is shown mounted to the back panel B. The connectorized optical conductor C is shown removed from the adapter. The connectorized optical conductor C has a connector C10 which is intended to be mated end to end to the connector of another conductor (not shown) inside the adapter assembly 10.

Panel B, of which only a portion is shown in FIG. 1, for example purposes, may be the back panel or part of the chassis of an electronic device (not shown), or may be part of a printed circuit board of the device. Panel B may have an architecture that allows any number of connectorized optical conductor assemblies to be connected thereto, although FIG. 1 shows one adapter assembly 10 mounted to panel B for example purposes. As noted before, the connectorized conductor assembly C generally comprises conductor T and connector C10. The conductor T may be a multi-fiber optical conductor having a number of optical conductor fibers (not shown) therein. The optical conductor fibers of the conductor T are terminated in connector C10. Connector C10 may be for example an MPO or MTP type connector. The present invention will be described below with particular reference to adapters for mating MTP or MPO type connectors. However, the present invention is equally applicable to any other type of adapter used for mating any desirable type of connector (such as SC, or LP connectors).

In this case, the optical connector C10 of cable assembly C, generally includes an outer housing C12, a release slide C14, and an inner ferrule C16. The inner ferrule C16 is located inside the housing C12 and holds the terminal ends of the optical fibers in the conductor C. A portion of the ferrule extends out at the front end C18 of the connector. The terminals of the optical fibers may be aligned in a row. The ferrule may hold as little as four or up to twelve or more terminals. The ferrule may be provided with a number of conventional guide pins (not shown) at the front end C18 which help interface the connector C10 to a mating connector inside the adapter. The outer housing C12 may be a plastic molding. As can be realized from FIG. 1, the housing C12 has a generally rectangular shape, although in alternate embodiments, the connector housing may have any other suitable shape. One side C20 of the housing C12 has a projecting key or guide C22 used for aiding insertion of the connector into the adapter assembly 10. According to the invention, the housing C12 also has recesses or detents, which are engaged by latches on the adapter described further below, to lock the connector C10 into the adapter. The recesses C24 may be located on opposite sides of the connector. The slide release C14 is slidably mounted on the outer housing C12 as shown in FIG. 1. The slide release C14 is preferably spring loaded along the housing C12 by any suitable spring (not shown). The spring biases the slide C14 towards the front C18 of the connector C10. The user moves the slide release C14 toward the rear C28 in order to release the latches on the adapter from the connector and thus release the connector from the adapter.

Figure 2:
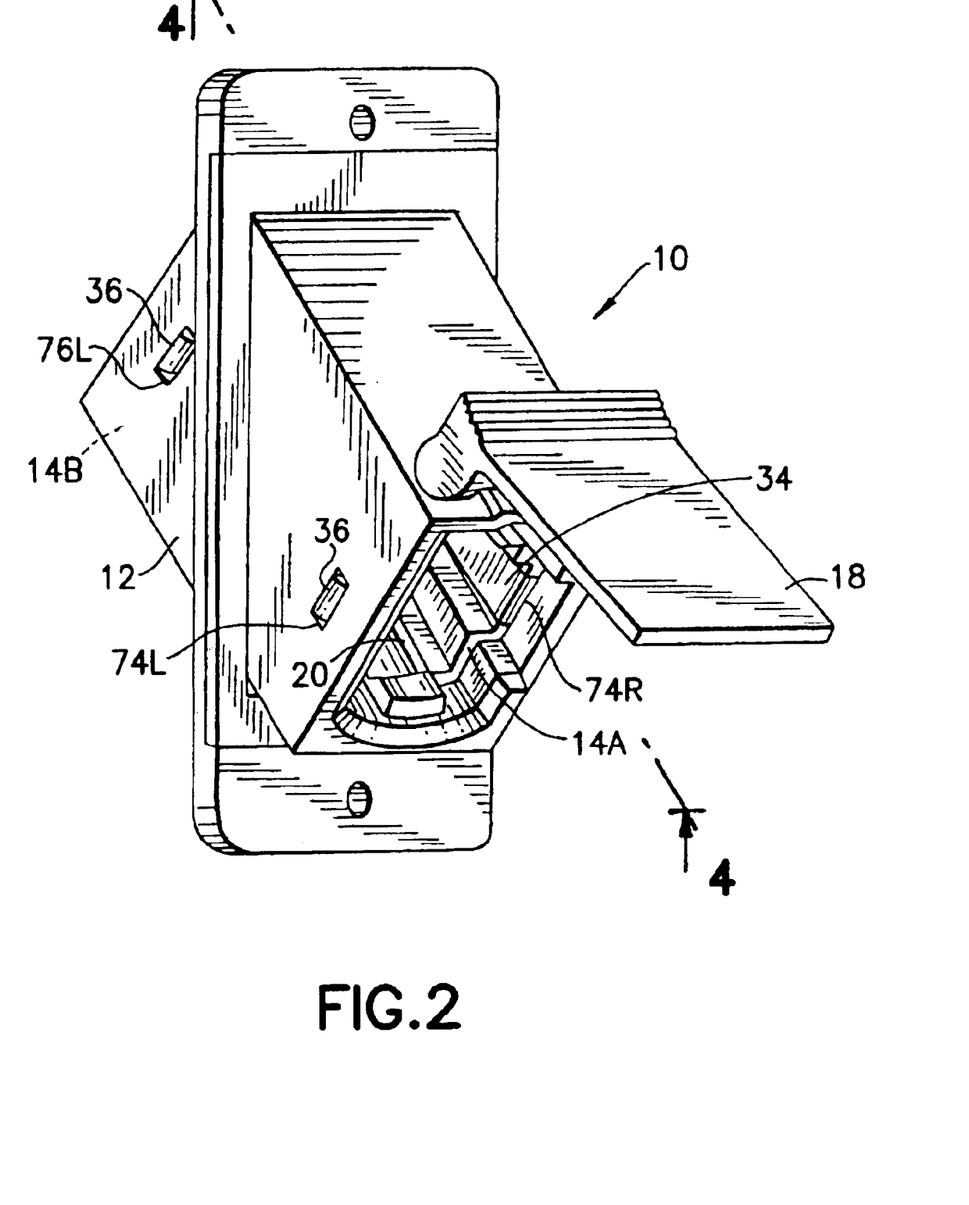
FIG. 2 is another perspective view of the optical connector adapter assembly in FIG. 1.
Figure 3:
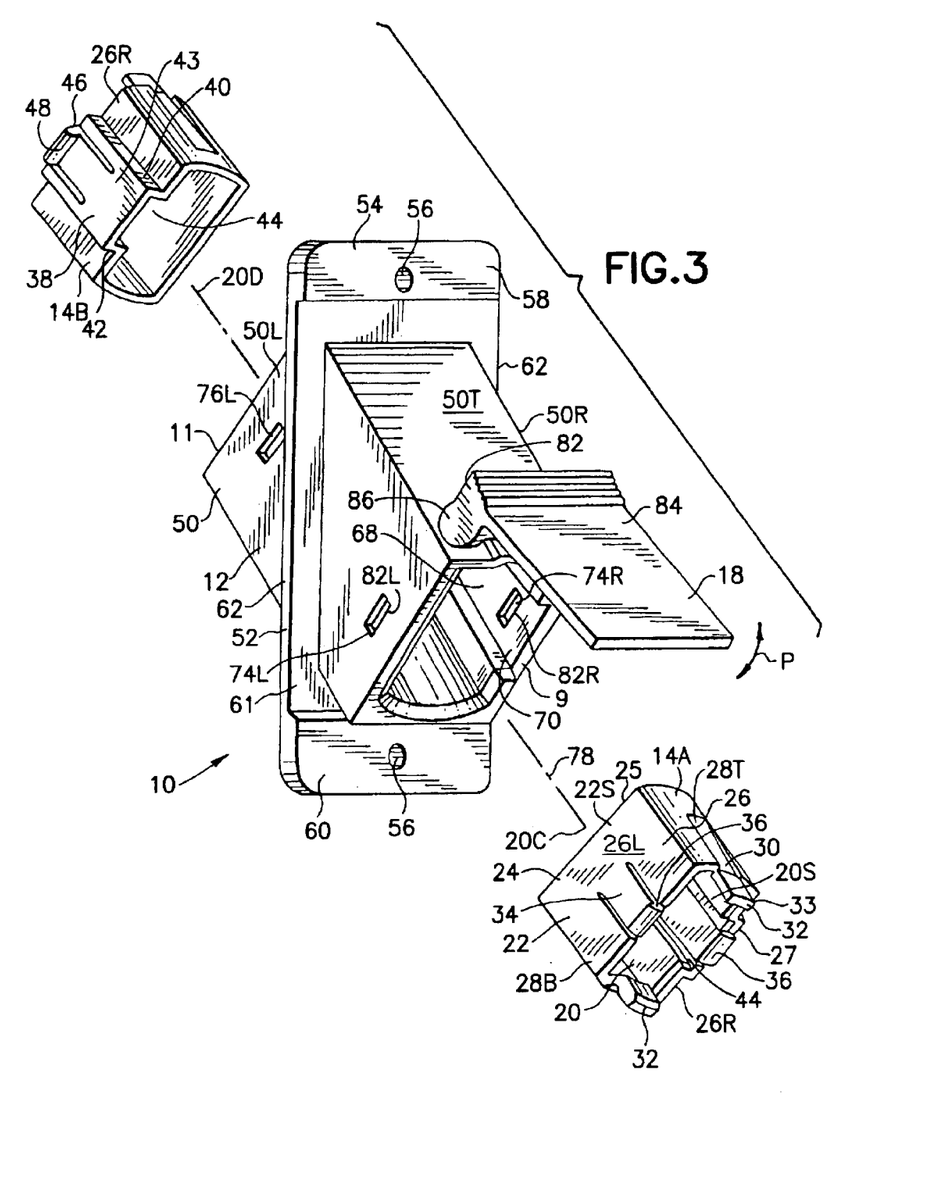
FIG. 3 is an exploded view of the optical connector adapter assembly in FIG. 1.

Referring now also to FIGS. 2 and 3, the optical connector adapter assembly 10 according to the invention, will be described, and generally comprises an outer housing 12, inner latch inserts or housings 14A, 14B, and in one embodiment a cover or door 18. The latch inserts 14, 16 are located inside the outer housing 12. The cover 18 is mounted on the outer housing 12. The cover is pivotable so that it may be opened or closed. When in its closed position (not shown), the cover 18 covers one end 9 of the adapter housing 12. In alternate embodiments, the adapter assembly may not have a cover.

As seen in FIG. 3, the adapter 10 has a pair of inner latch inserts 14A, 14B. In the preferred embodiment, both latch inserts 14A, 14B are substantially the same. Accordingly, the description below will refer in particular to one latch insert 14A unless otherwise noted. Latch insert 14A is preferably a one-piece member made of plastic or any other suitable non-metallic material. The latch insert may be formed by injection molding or any other suitable forming process. The latch insert has a generally tubular or shell shape which defines a receptacle or receiving area 20 therein. The receiving area 20 is shaped to conform to the exterior shape of the connector C10 so that the connector C10 and the inner surface 20S of the receiving area 20 form a close running or sliding fit. As seen in FIG. 3, the shell 22 of the latch insert 14A has a base section 24 at one end 25 and a flexible section 26 extending from the base section. The shell 22 has two narrow sides 28T, 28B which have a generally outwardly curved shape in the preferred embodiment (although in alternate embodiments the sides may be flat, or have any other suitable shape). The other sides 26L, 26R of the shell 22 are wider giving the shell a generally rectangular cross-section. One side 26 of the shell 22 has an outward protruding section 38 which extends longitudinally from one end 27 to the other end 25 of the shell 22 (protruding section 38 is seen more clearly on latch insert 14B in FIG. 3). The protruding section preferably has a general C shape with flat laterally projecting sides 40, 42 and a flat web 43 connecting the sides. In alternate embodiments, the outward projecting section may have any suitable shape and may extend for any desired length along the shell. The protruding section 38 defines a key on the outside of the shell and a guide channel 44 in the receiving area 20 of the latch insert 14A (14B). The guide channel 44 cooperates with the key C22 on the connector to aid insertion of the connector and alignment of the connector in the receiving area 20.

The base section 24 of the latch insert shell 22 has a continuous wall and thus is very rigid. The flexible section 26 has, as shown in FIG. 3 two pairs of opposing resiliently flexible arms 30, 34. In alternate embodiments, the flexible section of the latch insert shell may have any suitable number of arms. One pair of flexible arms 30 is located on opposing sides 26L, 26R of the shell. The arms 30, 34 are included in the respective sides 28T, 28B, 26L, 26R of the shell. The arms may thus be formed during molding of the shell, or after molding by cutting partial slots into the respective sides of the shell to form the arms. Arms 30 in sides 28T, 28B are connector latch arms used for locking the connector C10 into the receiving area 20 of the latch insert 14A. Latch arms 30 have inwardly projecting latch teeth 32 which are shaped to engage recesses C24 in the connector housing (see FIG. 1). In the preferred embodiment, the latch teeth 32 are located at the respective distal ends 33 of the connector latch arms 30, though in alternate embodiments the latch teeth may be disposed at any suitable location along the latch arms.

Figure 4:
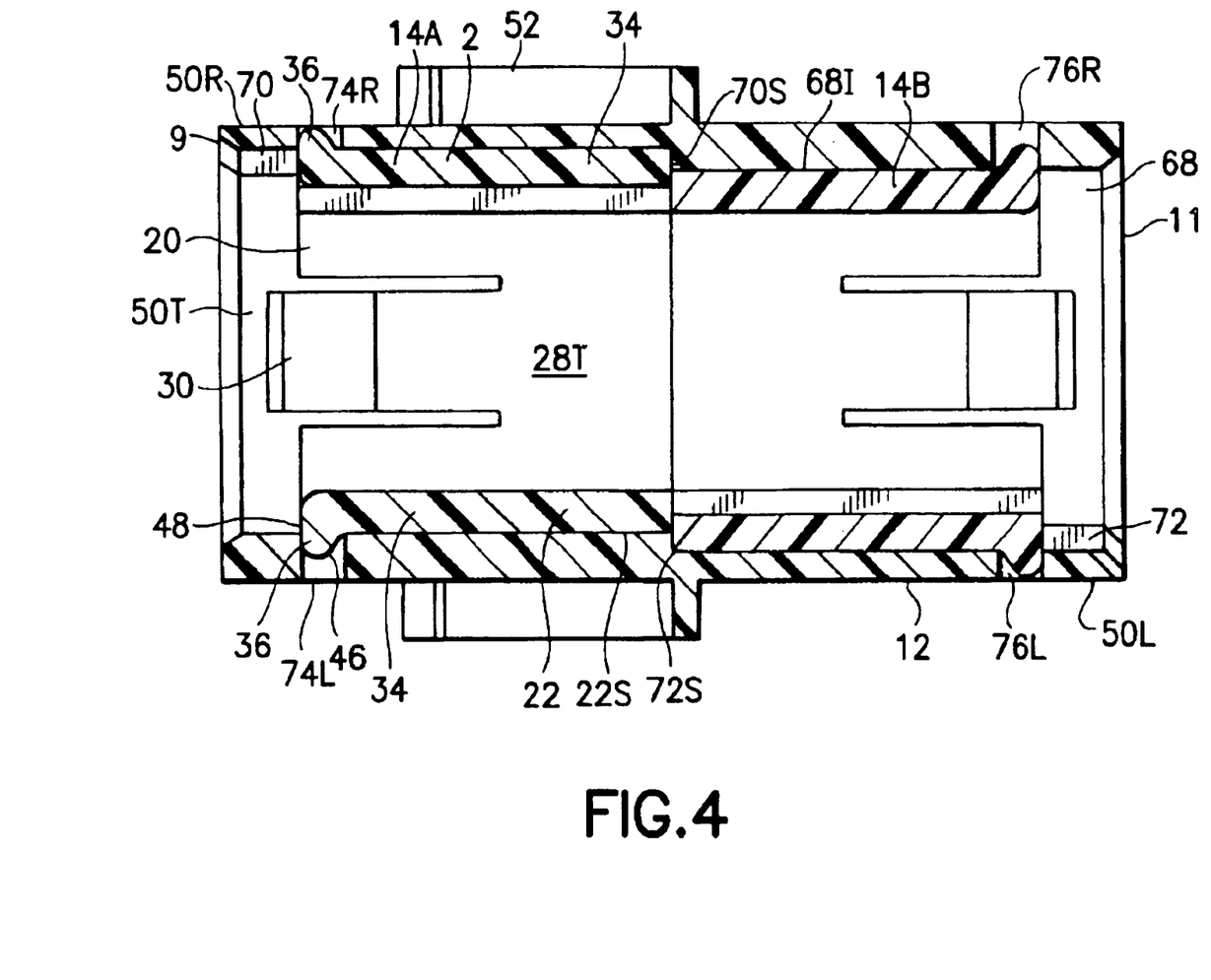
FIG. 4 is a cross-sectional elevation view of the optical connector adapter assembly taken along line 4—4 in FIG. 2.

Referring now also to FIG. 4, which is a cross-sectional view of the adapter assembly taken through line 4—4 in FIG. 2, latch arms 34 in sides 26 L, 26R also have latch teeth 36 located at the outer end of the arms. Latch teeth 36 project outwards from the shell 22. Each latch tooth 36 has a sloped camming surface 46 on one side and a stop surface on the opposite side. In one embodiment, the camming surface is facing end 25 of the shell, and the stop surface 48 is facing the opposite end 27 of the shell. In alternate embodiments, the camming and stop surfaces of the outward projecting teeth may have any other desired orientation. As seen in FIG. 3, teeth 36 may extend across the respective latch arms 34, though the teeth may be provided with any desirable width.

Still referring to FIGS. 2–4, the outer housing 12 of the adapter assembly 10 is a one-piece member, which in the preferred embodiment may be made from plastic or any other suitable material. The one-piece housing may also be made from metal such as aluminum alloy or steel such as in the case of a shielded connector. If made from plastic, the outer housing may be formed using any suitable molding process such as injection molding. In the case where the housing is metal, the housing may be shaped by casting or drop forging. The outer housing 12 comprises a mounting section 50 and a housing section 52. As seen in FIG. 3, the housing section 50 has a general tubular shape with passage 68 extending through the housing. In the preferred embodiment, the passage 68 has a general rectangular shape conforming to the outer surface 22S of the latch inserts 14A, 14B. As see in FIG. 3, the passage is oriented so that the latch inserts 14A, 14B are held in a vertical position in the housing 12. In the vertical position, side 28T of the inserts 14A, 14B is facing the top side 50T of the housing. As seen best in FIG. 4, passage 68 has two guide channels or slots 70, 72. In the preferred embodiment, guide channel 70 is formed into side 50R of the housing. Channel 72 is formed into the opposite side 50L of the housing. Guide channel 70 extends from one end 9 along the passage 68 into the housing and terminates in stop surface or edge 70S. As seen in FIG. 4, guide channel 72 is reciprocal to channel 70, extending from end 11 to stop 72S. The guide channels 70, 72 have a shape which conforms to the projection section 38 on side 26R of the inserts 14A, 14B. The projecting section 38 of each insert 14A, 14B forms a close sliding fit with the inner surface of the corresponding guide channels 70, 72. The stop surfaces 70S, 72S in each guide channel 70, 72 are located to stop insertion of the latch inserts when the inserts reach the installed position. In one embodiment, the stop surfaces 70S, 72S are substantially co-planner, located at about the midsection of the housing 12. This allows the latch inserts 14A, 14B to be abutted together. As seen in FIG. 4, in alternate embodiments, the stop surfaces in the respective guide channels may be located at some distance apart from each other, and may be located at any location along the passage 68. In another alternate embodiment, insertion stops for the latch inserts may be located on any side of the passage and outside the guide channel. In still other alternate embodiments, the guide channels may extend from one end of the passage to the other end.

As seen best in FIGS. 3 and 4, the vertical side walls 50L, 50R have two pairs of apertures 74L, 74R, 76L, 76R. One pair of apertures 74L, 74R is located proximate end 9 of the housing section 50. The other pair 76L, 76R is proximate the other end 11 of the housing section. Apertures 74L, 74R, 76L, 76R extend through the respective side walls 50L, 50R into the passage 68. The apertures 74L, 74R, 76L, 76R are sized to admit therein, from passage 68, the latch teeth 36 on latch arms 34 of the latch inserts 14A, 14B. In alternate embodiments, the housing section 50 may have any suitable type of detents or recesses formed into the side of the passage to engage the outward projecting latch teeth of the latch inserts.

Figure 5:
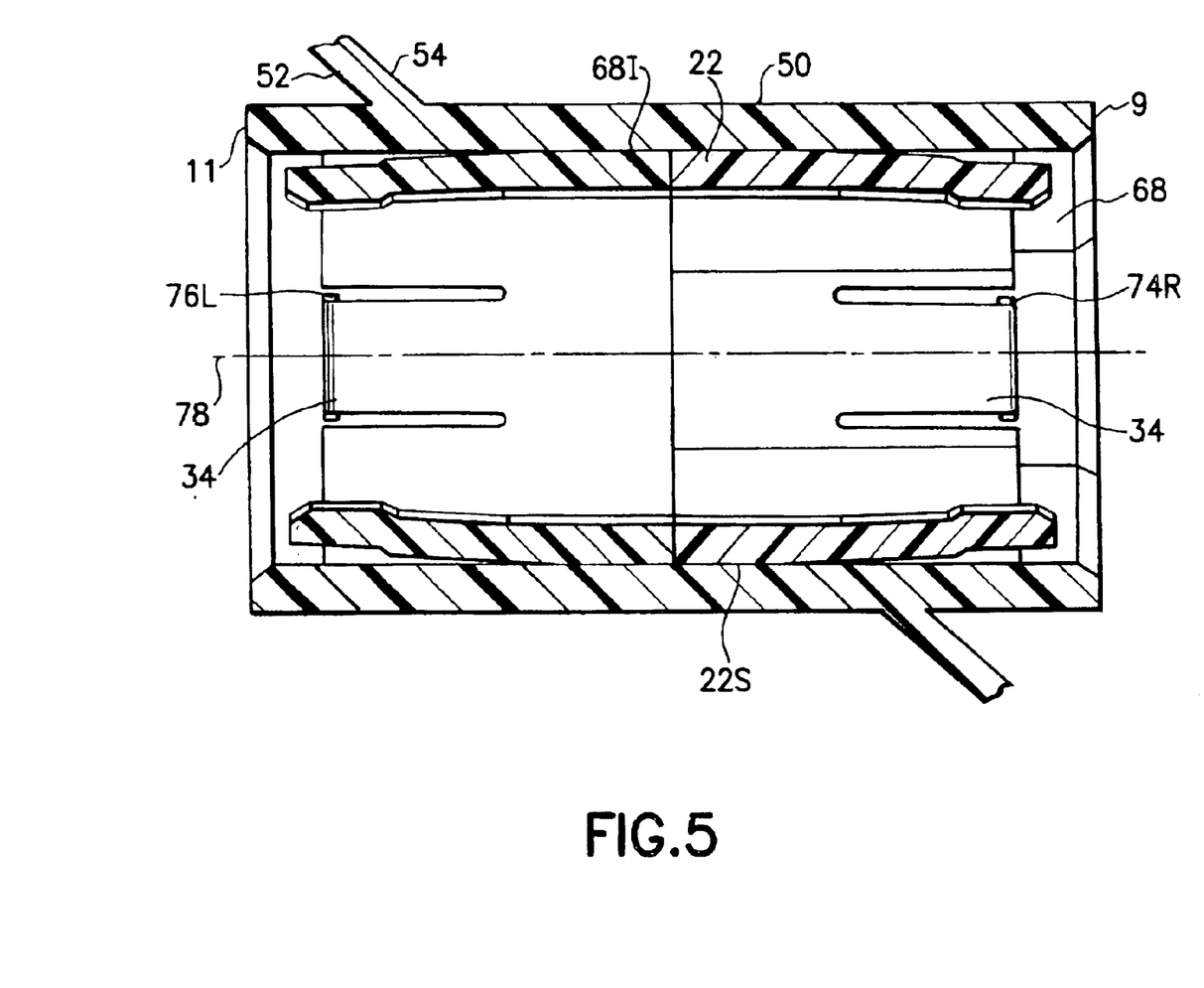
FIG. 5 is another cross-sectional elevation view of the optical connector adapter assembly in FIG. 2.

As seen in FIG. 3, the mounting section 52 is generally a flange which surrounds the tubular housing section 50. The mounting section 52 has a planar surface 54 which defines a seating surface for the mounting section. Referring also to FIG. 5, the housing section 52 and mounting section are angled relative to each other so that the center line axis, or axis of symmetry 78 of passage 68 is angled relative to the plane or surface 54. In the preferred embodiment, the angle is about 45°. In alternate embodiments, any acute angle may be used. In other embodiments (see for example FIG. 7) the mounting section and flange may be orthogonal. In still other alternate embodiments, the mounting section need not be a continuous flange, but may be a sectioned flange or a number of flanges forming co-planar or parallel planar surfaces. The mounting section 52 has fastener holes 56 in both the top and bottom sections 58, 60. The mounting section 52 also may have a recess 61 formed into surface 54 for an EMI gasket (not shown). The recess 61 extends along side portions 62, and across top and bottom sections 58, 60, thereby surrounding the housing section 50. In alternate embodiments, a gasket recess may not be provided.

The cover 18 is preferably a one-piece member which is made of plastic or any other suitable material. The cover has a general L shape with a mounting or base section 82 and a cover section 84. In one embodiment, the base section is at the top and the cover section 84 depends from the base section. The base section may include a cover 86, with a bore (not shown) for a pivot pin (not shown). The clevis 86 is configured to interface with a bored lug (not shown) on the top side 50T of housing section 50. The pin may be inserted through the bores in the lug and clevis to pivotally mount the cover 18 to the housing 50. The cover may be pivoted in the direction of arrow P between the open position shown in FIG. 3 and a closed position (not shown). A spring (not shown) such as a helically wound torsion spring, may be placed around the pin to bias the cover 18 towards the closed position. The cover section 84 depending from the base section 82 is of sufficient length and width to cover the opening of passage 68 in end 9 when the cover is in the closed position.

The adapter may be assembled merely by sliding the latch inserts 14A, 14B into the passage 68 of the housing section 50. Latch insert 14A is inserted into the passage 68 with end 25 first through the opening in end 9 of the housing. The projecting section 38 on the side 26R of the latch insert is received into the guide channel 70. Thus, the projecting section 38 on the latch insert 14A and the guide channel 70 form polarizing features which allow insertion of the insert through end 9 in the desired orientation. The insert 14A is inserted into the passage to the stop surface 70S. When abutted against the stop surface 70S, the insert 14A is located in its installed position as shown in FIGS. 4–5. During insertion, the camming surfaces 46 on the latch teeth 36 of latch arms 34 come into contact with the sidewalls of the passage. This causes the resiliently flexible arms 34 to be resiliently deflected inwards. As seen best in FIG. 4, when the insert 14A is in the installed position, the latch teeth 36 are aligned with corresponding apertures 74L, 74R. This allows the inwardly deflected latch arms 34 to resile outwards thereby inserting the latch teeth 36 into the corresponding apertures 74L, 74R. With the latch teeth 36 in the apertures, stop surface 48 on the teeth engages the edge 82L, 82R of the apertures preventing the insert from being withdrawn. Hence, in the installed position, insert 14A is clamped in the housing 50 between stop surface 70S on one side and the edge 82L, 84R of the apertures 74L, 74R on the other side (see FIG. 4). Insertion of latch teeth 36 into apertures 74L, 74R may provide an aural indication (i.e. a "snap") to the user that the insert 14A has been successfully installed. The open apertures 74L, 74R also allow the user to visually verify if installation is complete by checking to see if teeth 36 have been fully inserted into the apertures.

As seen in FIGS. 4 and 5, in the installed positions, the exterior 22S of the base section 22 of the latch insert contacts the interior surface 68I of the passage 68 all around the periphery of the base section. This ensures that the latch insert and in particular the centerline axis 20C of the receiving area 20 in insert 14A, is aligned with the centerline axis 78 of the passage.

Installation of the second latch insert 14 into the housing 50 is substantially similar to that described before with respect to insert 14A. Latch insert 14B is facing opposite from insert 14A, and is inserted into the passage 68 through the opening in end 11 of the housing. As seen in FIG. 4, guide channel 72 is located on sidewall 50L of the housing 50. Accordingly, insert 14B is rotated 180° about its centerline axis 20D relative to insert 14A in order to align projecting section 38 with guide channel 72. The insert 14B may then be inserted to the stop surface 72S which places the insert 14B in the installed position (see FIG. 4). The latch arms bias the latching teeth into apertures 76L, 76R locking the insert 14B into the housing section 50. As seen in FIG. 4, the latch inserts 14A, 14B are abutted against each other. The base section of latch insert 14B also interfaces with the inner surface 68I of the passage 68 so that the centerline axis 20O of the receiving area is aligned with axis 78 of the passage. Accordingly, the centerline axis 20C, 20D of the respective latch inserts are aligned with each other.

The adapter assembly 10 may be mated to the panel B by inserting a rear portion 51 of the adapter housing 50 through hole B3 in the panel. The planar surface 54 on the mounting section 52 is seated against the panel B. If desired, an EMI gasket (not shown) may be placed into recess 61 on the mounting section 50 before mounting the adapter to the panel. The adapter 10 may be secured to the panel B with suitable fasteners 91, such as machine screws, inserted through holes in the panel into fastener holes 56 on the mounting section. As shown in FIG. 1, when the adapter 10 is mounted to the panel B, the centerline axis 78 of the passage 68, and as noted before, also of the receiving areas 20 in the latch inserts 14A, 14B, is pitched relative to the panel B. The connector C10 is inserted into the adapter along axis 78. The connector C10 is received into the receiving area 20 of the latch insert 14A. The guide channel 44 in the receiving area allows insertion of the connector when the projecting key C22 of the connector C10 is aligned with the guide channel 44. When the connector C10 reaches the installed position spring latches 32 automatically engage the recesses C24 on the connector to lock the connector inside the receiving area. An opposing connector (not shown) may be inserted in a similar manner into the receiving area of the second latch insert 14B.

As noted before, the receiving areas of the two latch inserts 14A, 14B are precisely aligned with each other by the one-piece outer housing 50 of the adapter. Hence, the opposing connectors inside the receiving area are also precisely aligned. This allows the ends of the connectors to be connected resulting in a connection of high fidelity. As can be realized, adapter assembly 10 has many advantages over conventional adapters. One advantage with respect to conventional adapters having sectioned outer housings is that adapter 10 eliminates any bonding or securing of housing sections together. After installation of the latch inserts 14A, 14B into the one-piece housing, the adapter assembly is complete. No further time and hence cost need be expended in order to secure sections of the outer housing together as in conventional adapters. In the case of conventional adapters with bonded housing section, additional expense and time is spent in the bonding process. Also, errors in alignment of the housing sections, and hence of the connector receiving areas in the different housing sections, may be introduced during the positioning of the housing sections prior to bonding. Precise alignment of housing sections in conventional adapters may be especially difficult in the case where the mounting section and housing section of the adapter are slanted relative to one another (similar to adapter 10 in FIG. 1). The bonding seam or interface in such conventional connectors is generally located at or along the mounting section. Thus, the bonding interface may itself be pitched relative to either the mounting section or housing section of such conventional adapters. In this case special tooling may have to be used to ensure precise alignment of the housing section prior to bonding. These problems are resolved by adapter assembly 10.

Figure 6:
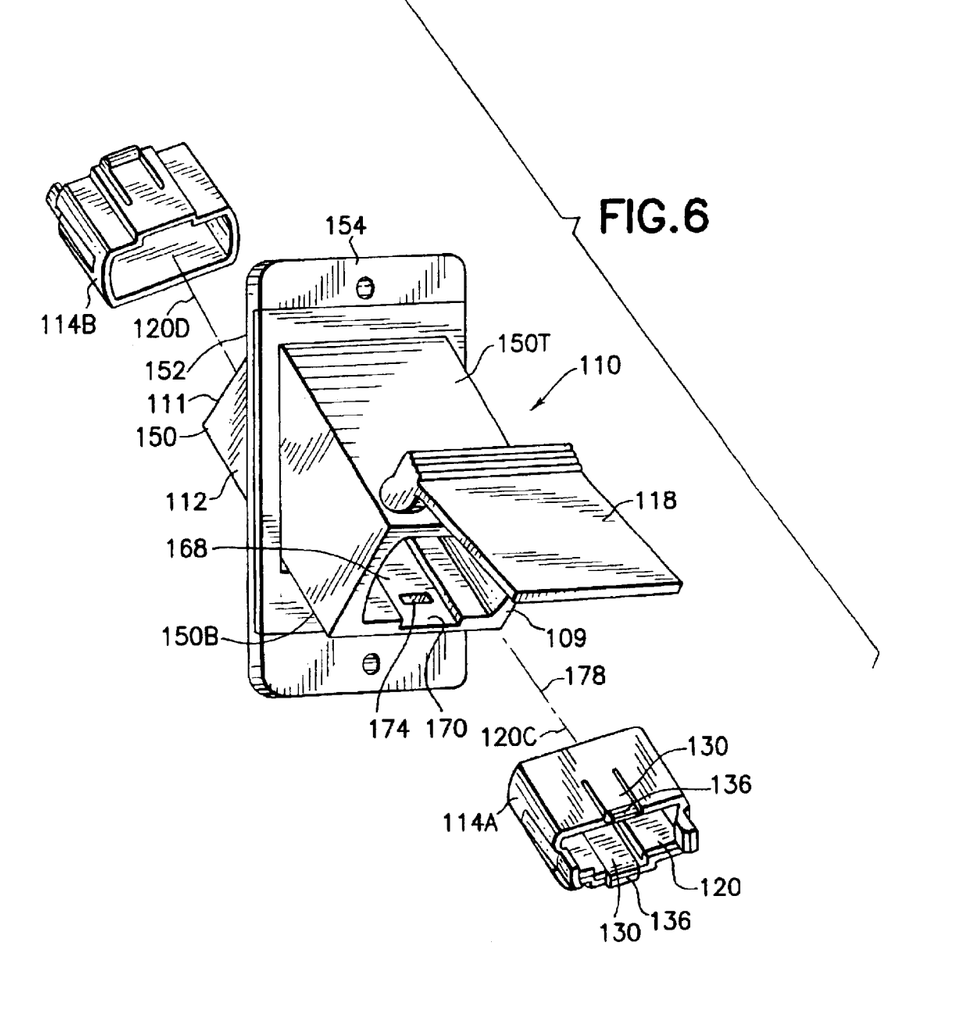
FIG. 6 is an exploded perspective view of an optical connector adapter assembly in accordance with another preferred embodiment of the present invention.

Referring now to FIG. 6, there is shown a connector adapter assembly 110 in accordance with another embodiment of the present invention. Except as otherwise noted below, adapter assembly 110 is generally similar to assembly 10 described previously and shown in FIGS. 1–5. Similar features are similarly numbered. Assembly 110 comprises outer housing 112, latch insert 114A, 114B and cover 118. The adapter 110 is also shown as an angled adapter wherein when the adapter is mounted to a panel (similar to adapter 10 mounted to panel B in FIG. 1), the centerline axis 178 of the receiving area 120 is angled relative to an axis normal to the panel. The outer housing 112 comprises mounting section 152 and housing section 150. The outer housing is a one piece member which may be a plastic injection molding or may be cast or otherwise formed by any suitable method such as drop forging from metal. The housing section 150 has passage 168 extending through the housing section. The passage has centerline axis 178 which, as seen in FIG. 6, is angled relative to the mounting section 152 and planar surface 154. The passage 168 is sized so that inner latch inserts 114A, 114B can slide respectively into the passage 168 from opposite ends 109, 111 of the housing. In this case, the passage 168 is oriented so that the latch inserts are positioned in the housing in a horizontal position. As seen in FIG. 6, one of the guide channel 170 which polarizes the orientation of the insert 114A in the passage 168, is located in the bottom side 150B of the housing. The second guide channel (not visible in FIG. 6) for guiding insert 114B into the passage 168 may be formed into the top side 150T of the housing. Latch apertures 174 (only one is visible in FIG. 6) for latching the inserts 114A, 114B into the housing are located in this embodiment in the top 150T and bottom 150B sides of the housings. The latch inserts 114A, 114B are substantially identical to inserts 14A, 14B. In the embodiment shown in FIG. 6, the latch inserts 114A, 114B are rotated 90° about their longitudinal axis (i.e. the latch inserts 114A, 114B are shown in a horizontal position) in comparison to the latch inserts 14A, 14B depicted in FIGS. 1 an 3. The latch inserts 114A, 114B have resiliently flexible latch arms 130, with projections 136 to engage apertures 174 and lock the inserts to the housing. When installed into passage 168, the centerline axes 120C, 120D of the receiving areas 120 of the inserts 114A, 114B are aligned with centerline axis 178 of passage 168. Hence, the receiving area 120 of the inserts are also accurately aligned with each other. Cover 118 is pivotably mounted to one end 109 of the adapter, and can be pivoted to a closed position where the cover 118 covers the opening to passage 168.

Figure 7:
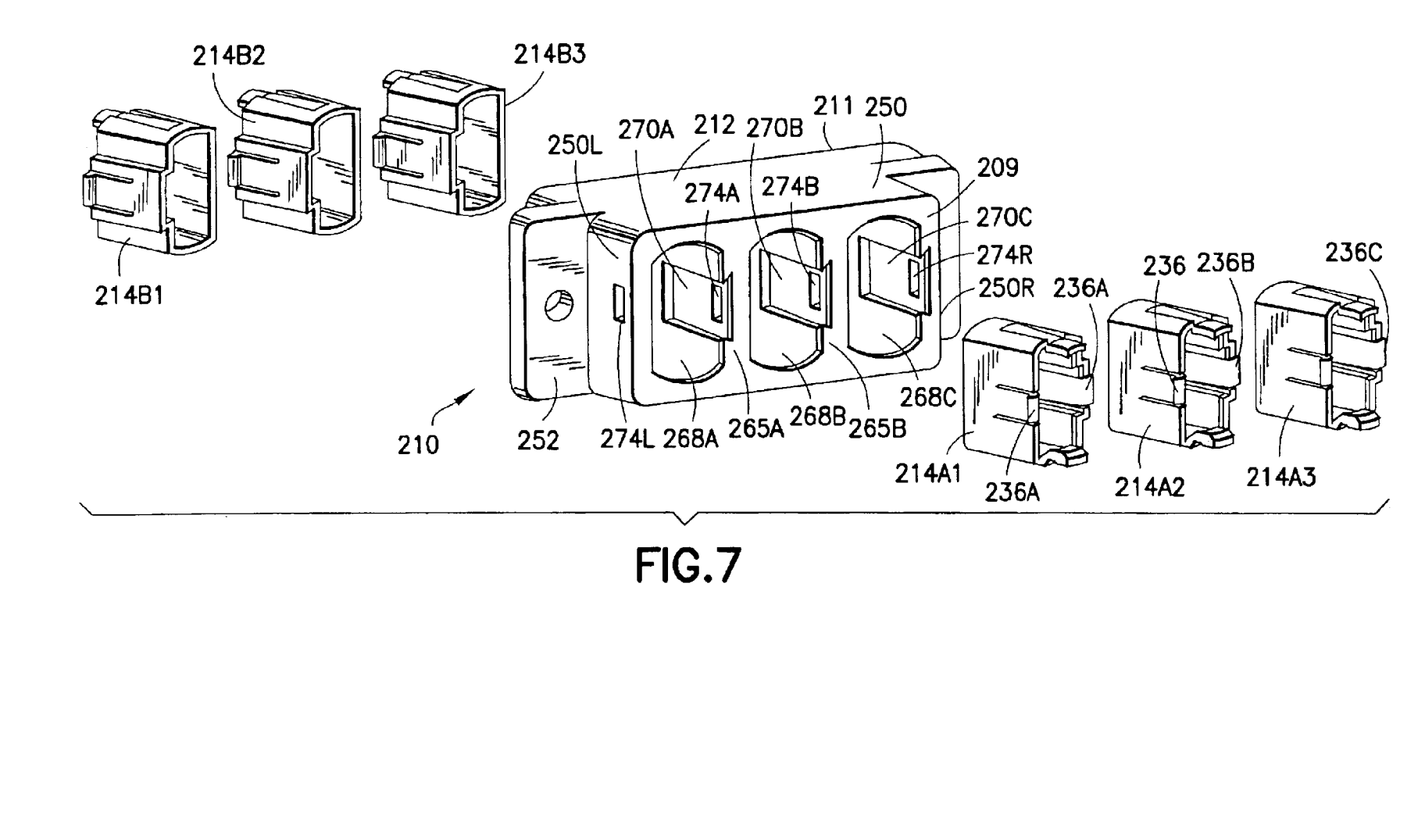
FIG. 7 is yet another exploded perspective view of an optical connector adapter assembly in accordance with still another preferred embodiment of the present invention.

Referring now to FIG. 7, there is shown an adapter assembly 210 in accordance with another preferred embodiment of the present invention. Except as otherwise noted, adapter assembly 210 is generally similar to adapter assembly 10 described before and shown in FIGS. 1–5. Hence, similar features are similarly numbered. The adapter assembly comprises an outer housing 212 and pairs of opposing latch inserts 214A1, 214B1, 214A2, 214B2, 214A3, 214B3 located therein. In the embodiment shown in FIG. 7, the adapter 210 is adapted for accommodating multiple pairs of connectors (each connector being similar to connector C10 in FIG. 1) intended to be connected end to end to respective mating connectors (not shown) inside the adapter 210. Accordingly, the outer housing 212 of the adapter has multiple passage 268A, 268B, 268C. The housing 212 in FIG. 7 is shown as having three passages 268A, 268B, 268C for example purposes, and in alternate embodiments the housing may have any desired number of passages. As can be realized from FIG. 7, the passages 268A, 268B, 268C are disposed so that the latch inserts 214A1, 214B1, 214A2, 214B2, 214A3, 214B3 are held in a vertical position. The latch inserts 214A1, 214B1, 214A2, 214B2, 214A3, 214B3 are substantially the same as latch inserts 14A, 14B described before and shown in FIGS. 3–5. The outer housing 212 is a one-piece member molded from plastic, or in the case of a shielded adapter, shaped from metal such as aluminum alloy or steel. The outer housing 212 comprises mounting section 252 and housing section 250. As stated before, the housing section 250 has passages 268A, 268B, 268C which extend through the housing section 250 from one end 209 to another 211. All passages 268A, 268B, 268C are substantially similar to each other. Housing section 250 has interstitial walls 265A, 265B separating the passages. Each passage has two guide channels therein (only the guide channels 270A, 270B, 270C on one side of the housing are visible in FIG. 7) for guiding insertion of the corresponding pairs 214A1, 214B1; 214A2, 214B2; 214A3, 214B3 into the respective passages 268A, 268B, 268C. Latch apertures 274L, 274A, 274B, 274R (only the latch apertures on one side of the housing are visible in FIG. 7) are provided in the housing walls 250L, 265A, 265B, 250R to engage the spring loaded latch teeth 236A, 236B, 236C on the latch inserts. Latch apertures 274A, 274B are respectively located in interstitial walls 265A, 265B. As can be realized from FIG. 7, these intermediate apertures 274A, 274B are each engaged by two latch teeth (e.g. aperture 274A is engaged by one latch tooth 236A of insert 214A1, and on the other side by latch tooth 236B of insert 214A2). Accordingly, the latch apertures 274A, 274B have sufficient depth to allow full engagement of the latch teeth into the apertures.

The adapter 210 is assembled in a manner substantially similar to that previously described for adapter 10 in FIGS. 1–3. Each pairs of inserts 214A1, 214B1, 214A2, 214B2, 214A3, 214B3, is inserted into the corresponding passage 268A, 268B, 268C, from opposite ends 209, 211 of the housing section 250. Upon reaching their installed position, the spring loaded latch teeth 236A, 236B, 236C, of the respective latch inserts automatically engage the apertures 274L, 274A, 274B, 274R in the housing locking the latch inserts in the housing. The one-piece member housing 250 ensures that the latch inserts in each and every passage (e.g. inserts 214A1, 214B1, in passage 268A, inserts 214A2, 214B2, in passage 268B, and inserts 214A3, 214B3, in passage 268C,) of the housing are aligned with each other allowing accurate mating of the connectors inserted into the latch inserts. This is not the case with conventional optical connector adapters having multiple passages. For example, in the conventional adapters, any misalignment between housing sections that occurs during bonding is compounded when extended to the multiple passages in the adapter. Thus, a minor misalignment at one point is magnified when taken to the other locations of the housing. In adapter 210 shown in FIG. 7, the opposing latch inserts are always properly aligned for each and every passage in the adapter housing.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector adapter comprising:
    a housing having at least one passage formed therein for receiving a pair of connectors adapted to be mated to each other; and
    a pair of separate latch inserts individually located in the at least one passage, each latch insert being adapted for locking a corresponding connector of the pair of connectors to the housing, and at least one latch insert of the pair of latch inserts having a spring loaded projection;
    wherein the housing has at least one detent formed therein, the spring loaded projection on the at least one latch insert being biased into the at least one detent locking the at least one latch insert to the housing.
2. The optical connector adapter according to claim 1, wherein the housing is a one-piece member.
3. The optical connector adapter according to claim 1, wherein the at least one detent is a recess formed in a side of the at least one passage.
4. The optical connector adapter according to claim 1, wherein the detent is an aperture extending through a side wall of the at least one passage.
5. The optical connector adapter according to claim 1, wherein the at least one latch insert has an exterior surface which complements an interior surface of the at least one passage, and has a resiliently flexible arm which supports the spring loaded projection.

6. The optical connector adapter according to claim 5, wherein the exterior surface of the at least one latch insert complements the interior surface of the at least one passage around a perimeter of the exterior surface.

7. The optical connector adapter according to claim 1, wherein an exterior surface of the at least one latch insert contacts an interior surface of the at least one passage so that the at least one latch insert is stably held in at least one passage in alignment with another of the pair of latch inserts.

8. The optical connector adapter according to claim 1, wherein the at least one latch insert has a pair of latching arms for latching to the corresponding connector.

9. The optical connector adapter according to claim 1, wherein the spring loaded projection comprises a camming surface.

10. The optical connector adapter according to claim 1, wherein the spring loaded projection is adapted for preventing the at least one latch insert from being withdrawn from the housing.

11. The optical connector adapter according to claim 9, wherein the camming surface is adapted for causing resilient deflection of the spring loaded projection during insertion of the at least one latch insert.

12. The optical connector adapter according to claim 1, further comprising at least one door mounted on the housing.

13. An optical connector adapter comprising:
a housing having at least one passage formed therein for receiving a pair of connectors adapted to be mated to each other; and
a pair of latch inserts located in the at least one passage, each latch insert being adapted for locking a corresponding connector of the pair of connectors to the housing, and at least one latch insert of the pair of latch inserts having a spring loaded projection;
wherein the housing has at least one detent formed therein, the spring loaded projection on the at least one latch insert being biased into the at least one detent locking the at least one latch insert to the housing; and,
wherein the housing has another detent and a second latch insert from the pair of latch inserts has another spring loaded projection which is biased into the other detent in the housing.

14. An optical connector adapter comprising:
a housing having at least one passage formed therein for receiving a pair of connectors adapted to be mated to each other; and
a pair of latch inserts located in the at least one passage, each latch insert being adapted for locking a corresponding connector of the pair of connectors to the housing, and at least one latch insert of the pair of latch inserts having a spring loaded projection; wherein the at least one latch insert has another resiliently flexible arm with another spring loaded projection, the resiliently flexible arm and the other resiliently flexible arm being on opposite sides of the at least one latch insert
wherein the housing has at least one detent formed therein, the spring loaded projection on the at least one latch insert being biased into the at least one detent locking the at least one latch insert to the housing.

15. An optical connector adapter comprising:
a housing having at least one passage formed therein for receiving a pair of connectors adapted to be mated to each other; and
a pair of latch inserts located in the at least one passage, each latch insert being adapted for locking a corresponding connector of the pair of connectors to the housing, and at least one latch insert of the pair of latch inserts having a spring loaded projection;
wherein the housing has at least one detent formed therein, the spring loaded projection on the at least one latch insert being biased into the at least one detent locking the at least one latch insert to the housing, wherein the at least one passage comprises multiple passages formed through the housing, each of the multiple passages being adapted to receive a corresponding pair of latch inserts therein.

16. An optical connector adapter comprising:
an outer housing with at least one passage extending through the outer housing for mating a pair of opposing connectors therein; and
a pair of inner housings located in the at least one passage, each inner housing having a receptacle for receiving a corresponding connector of the pair of connectors, and a deflectable latch locking the inner housing to the outer housing;
wherein the outer housing is a one-piece member, the pair of inner housings are adapted to be inserted into the at least one passage from opposite ends of the at least one passage.

17. An optical connector adapter comprising:
an outer housing with at least one passage extending through the outer housing for mating a pair of opposing connectors therein; and
a pair of inner housings located in the at least one passage, each inner housing having a receptacle for receiving a corresponding connector of the pair of connectors, and a latch for locking the corresponding connector to the inner housing;
wherein the outer housing is a one-piece member, the pair of inner housings are adapted to be inserted into the at least one passage from opposite ends of the at least one passage, wherein the outer housing has at least one guide rail, and at least one of the pair of inner housings has a complementing guide, the complementing guide and guide rail being slidably interlocked when the at least one inner housing is inserted into the at least one passage.

18. The optical connector adapter according to claim 17, wherein the interlocked complementing guide and guide rail align the at least one inner housing with another of the pair of inner housings in the at least one passage.

19. The optical connector adapter according to claim 17, wherein the guide rail comprises a channel formed into a side wall of the at least one passage, the channel being aligned with an insertion axis of the at least one passage.

20. An optical connector adapter comprising:
an outer housing with at least one passage extending through the outer housing for mating a pair of opposing connectors therein; and
a pair of inner housing located in the at least one passage, each inner housing having a receptacle for receiving a corresponding connector of the pair of connectors, and a latch for locking the corresponding connector to the inner housing;
wherein the outer housing is a one-piece member, the pair of inner housings are adapted to be inserted into the at least one passage from opposite ends of the at least one passage; wherein the outer housing has at least one guide rail, and at least one of the pair of inner housings has a complementing guide, the complementing guide and guide rail being slidably interlocked when the at least one inner housing is inserted into the at least one passage; and wherein the at least one guide rail comprises a pair of guide rails, the guide rails being offset relative to each other at least in part so that a first one of the pair of guide rails allows insertion of one inner housing from one end of the passage, and a second one of the pair of guide rails allows insertion of a second inner housing from the opposite end of the passage.

21. An optical connector adapter comprising:

an outer housing with at least one passage extending through the outer housing for mating a pair of opposing connectors therein; and a pair of inner housings located in the at least one passage, each inner housing having a receptacle for receiving a corresponding connector of the pair of connectors, and a latch for locking the corresponding connector to the inner housing;

wherein the outer housing is a one-piece member, the pair of inner housings are adapted to be inserted into the at least one passage from opposite ends of the at least one passage; wherein each inner housing of the pair of inner housings has a spring loaded latch, and the outer housing has detents formed therein, and wherein the spring loaded latch on each inner housing automatically engages the detents when each inner housing is inserted into the outer housing and locking and locks each inner housing in the outer housing.

22. An optical connector adapter comprising:

an outer housing with at least one passage extending through the outer housing for mating a pair of opposing connectors therein; and a pair of inner connector receptacles located in the passage, each inner connector receptacle being adapted for receiving a corresponding connector of the pair of opposing connectors and for locking the corresponding connector to the outer housing;

wherein the outer housing has a pair of guide rails for guiding insertion of the pair of inner connector receptacles into the at least one passage, a first one of the guide rails allowing insertion of a first one of the inner connector receptacles through only one end of the at least one passage and a second one of the guide rails allowing insertion of a second one of the inner connector receptacles through only an opposite end of the at least one passage.

23. The optical connector adapter according to claim 22, wherein the outer housing is a one piece member.

24. The optical connector adapter according to claims 22, wherein the pair of guide rails are disposed on opposite sides of the at least one passage.

25. The optical connector adapter according to claims 22, wherein the pair of guide rails are formed into walls of the at least one passage.

26. The optical connector adapter according to claims 22, wherein the at least one passage comprises multiple passages each being adapted for mating a corresponding pair of opposing connectors therein.

27. The optical connector adapter according to claims 22, wherein the outer housing is a one-piece member and has a mounting section which is angled at an acute angle relative to a centerline axis of the at least one passage.

28. A method for fabricating an optical connector adapter, the method comprising the steps of:

providing an outer housing which is a one piece member, the outer housing being adapted for mating a pair of optical connectors therein, and having at least one passage extending through the outer housing;

inserting a first inner housing into the at least one passage, the first inner housing having a first receptacle adapted for receiving a first connector of the pair of connectors;

securing the first inner housing to the outer housing;

inserting a second inner housing into the at least one passage, the second inner housing having a second receptacle adapted for receiving a second connector of the pair of connectors; and securing the second inner housing to the outer housing;

wherein the first and second inner housings are inserted into the at least one passage through opposite ends of the at least one passage.

29. The method according to claim 28, wherein securing the first inner housing comprises providing the first inner housing with a pair of spring loaded projections which engage detents in the outer housing when the first inner housing is inserted into the outer housing and lock the first inner housing in the outer housing.

30. The method according to claim 28, wherein securing the second inner housing comprises providing the second inner housing with a pair of spring loaded projections which engage detents in the outer housing when the second inner housing is inserted into the outer housing and lock the second inner housing in the outer housing.

31. An optical connector adapter comprising:

a housing having at least one passage formed therein for receiving a pair of connectors adapted to be mated to each other; and a pair of latch inserts located in the at least one passage, each latch insert being adapted for locking a corresponding connector of the pair of connectors to the housing, and at least one latch insert of the pair of latch inserts having a spring loaded projection;

wherein the housing has at least one detent formed therein, the spring loaded projection on the at least one latch insert being biased into the at least one detent locking the at least one latch insert to the housing further comprising at least one door mounted on the housing, wherein the adapter is adapted for mounting to a panel, and wherein the centerline axis of the at least one passage is pitched relative to the panel.

32. The optical connector adapter according to claim 31, wherein the adapter is adapted for mounting with an EMI gasket.

* * * * *